United States Patent Office 3,793,431
Patented Feb. 19, 1974

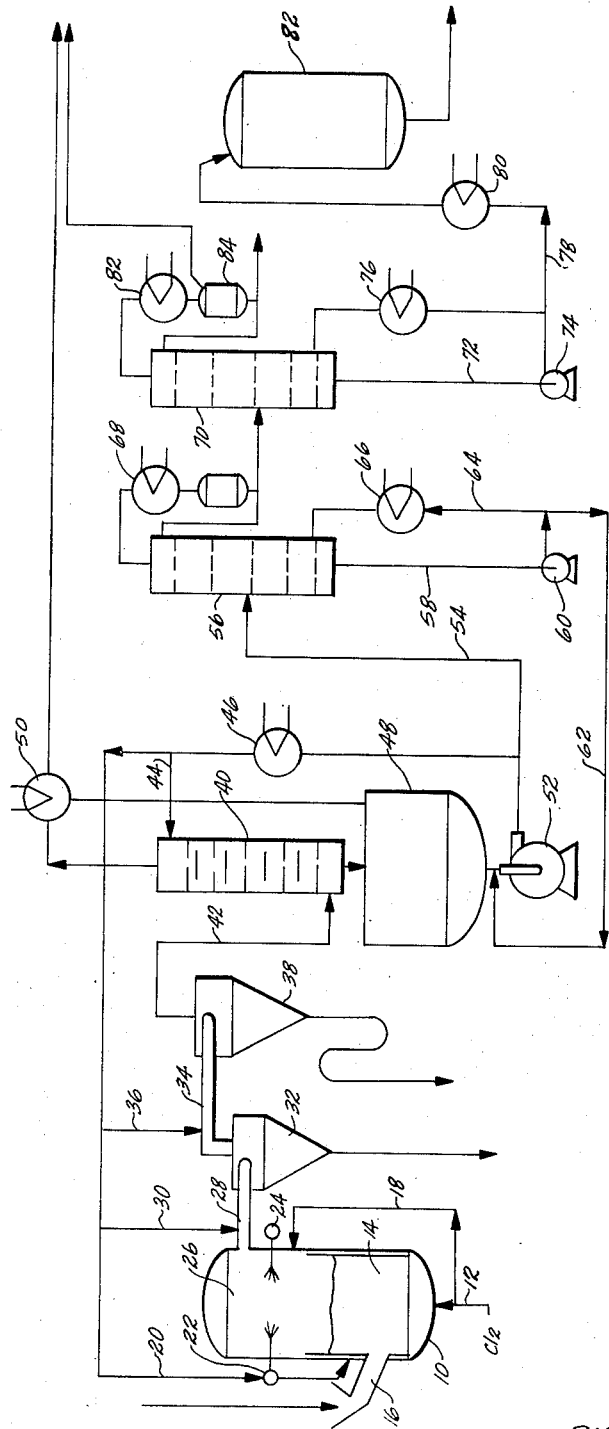

3,793,431
HIGH TEMPERATURE PROCESS FOR ANTIMONY
TRICHLORIDE PRODUCTION
Richard M. Gundzik, Placentia, Calif., assignor to Occidental Petroleum Corporation, Los Angeles, Calif.
Filed Sept. 28, 1971, Ser. No. 184,452
Int. Cl. C01b 9/02, 29/00
U.S. Cl. 423—88
51 Claims

ABSTRACT OF THE DISCLOSURE

There is provided a high temperature chlorination process for the production of metal chlorides from their sulfide derivatives in particular for the production of antimony trichloride from stibnite-bearing ores. In this process a portion of the sulfur formed in the reaction is recovered at an early stage. A crude liquid mixture of metal chloride particularly antimony chloride and sulfur is then condensed. A portion of the condensate is preferably recycled as a quench for the reactor, for the high temperature streams emanating from the reactor and to condense a mixture of crude antimony trichloride and sulfur. A portion of the crude condensate is passed on for purification of the metal chloride or antimony trichloride. In this process, ultimately all of the sulfur and antimony trichloride produced in the chlorination process is recovered as a product. The antimony trichloride recovered is of a product in excess of 99 percent and there is not formed the oxides of sulfur.

BACKGROUND OF THE INVENTION

Stibnite or antimony sulfide is found in a variety of ores. Dressing of the ores by various means including flotation will yield a high stibnite content concentrate which still contains normal, common contaminants, such as arsenic, lead, zinc, silver and the like.

Of these, arsenic is a particularly notorious contaminant in that its behavior is sufficiently similar to antimony in that it tends to be carried along with the antimony in conventional processes usually employed to convert stibnite to antimony metal, antimony chlorides or other antimony derivatives.

In certain regions of the United States, for instance, the arsenic content of the ore can be as high as about 10 percent and such ores have not been, heretofore, processed to any extent for recovery of antimony because of the tendency of arsenic to remain as a contaminant in the product.

Several processes are generally employed for obtaining antimony or antimony derivatives from stibnite-bearing ores.

Some basically involve pyrometallurgical methods.

One such process involves direct oxidation in which stibnite is converted to volatilized antimony oxide by the reacton $$2Sb_2S_3 + 9O_2 \rightarrow 2Sb_2O_3 + 6SO_2 \qquad (1)$$

The volatilized antimony oxide is recovered in flues, condensing pipes, baghouses, precipitators and the like.

The sulfur dioxide generated is generally vented to the atmosphere as a pollutant or presents a pollution control problem.

Another process involves merely heating the ore to melt the antimony sulfide which is drained from the ore as a liquid. The product is then converted to other antimony derivatives, however, sulfur dioxide is also generated as a byproduct.

Stibnite has also been reacted directly with carbon or iron to form stibnite metal. The antimony produced by such process is usually of low purity and volatilization losses high.

Blast furnace melting has also been employed, but capital costs are high and there is generated sulfur dioxide.

In U.S. Pat. 3,432,255 to Long et al., there is provided a process for converting ores containing a variety of metals including antimony to chloride compounds by reaction with hydrogen chloride and an oxidizing gas, i.e., air or oxygen, at temperatures sufficiently high such that the desired metal values are converted to volatile chloride compounds. The process employs, in general, an excess of oxygen required for the desired reaction and where antimony is present in the ore it is normally formed as iron-free antimony oxychloride.

Although antimony may be present, the primary metal sought is molybdenum. The object, moreover, is to form desired metal chlorides free of iron, tungsten, calcium, magnesium and lead. No mention is made of processing an arsenic-bearing ore.

In British patent specification 778,705, oxides of aluminum, tin, silicon, zinc, antimony, chromium, beryllium, zirconium, cobalt, nickel, boron, cadmium, lithium, and vanadum are prepared by halite hydrolysis by introducing the halide under its own vapor pressure into a cylindrical reaction zone and simultaneously injecting a mixture of hydrogen and an oxygen containing gas tangentially into the reactor to form water and hydrolyze the halide. The metal oxide reaction products may be separated from the reaction gases by cyclones and the solids-free gases scrubbed to remove any acids formed.

SUMMARY OF THE INVENTION

According to the present invention there is provided a high temperature process for the chlorination of metal chlorides boiling below sulfur and in particular the chlorination of stibnite-bearing ores to obtain as principal products high purity antimony trichloride and sulfur.

The process involves in general, chlorinating a metal sulfide such as stibnite-bearing ore at an elevated temperature to form the corresponding metal chloride, particularly antimony chloride and sulfur which pass with, at times, part of the gangue from the high temperature chlorination zone. The gangue, if present, is separated first and a portion of the sulfur contained in the gaseous stream condensed and collected as liquid sulfur. The balance of this stream containing a crude mixture of metal chlorides, particularly antimony trichloride, and some sulfur are condensed as a crude liquid. A portion of this liquid is preferably continuously recycled to act as an indirect or direct coolant in the condensation zone, as a coolant or quench for the gases exiting the chlorination reactor and as a direct quench to aid in controlling the temperature at which chlorination occurs. The balance of the crude liquid stream is then purified to form high purity metal chloride, especially antimony trichloride free of arsenic compounds.

THE DRAWING

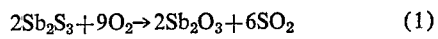

The attached drawing is an illustration of the preferred process scheme employed in the practice of this invention.

DESCRIPTION

According to the present invention, there is provided a high temperature process for converting metal sulfides such as stibnite to antimony-trichloride or a corresponding metal chloride boiling below sulfur with full conservation of sulfur.

The process in general will be described in terms contacting a stibnite-bearing ore with chlorine gas at an elevated temperature to form antimony trichloride and sulfur as its principal products.

These ingredients and, at times, some of the gangue is carried over in a solids-gas phase. The gangue, when present, is separated from the gas phase which is generally crude after an initial cooling and the balance of the gas phase passed to a sulfur separation zone where a portion of the sulfur present in the crude gas phase is condensed for recovery.

The remainder of the crude gas phase containing gaseous antimony-trichloride and sulfur is passed through a condensation zone where there is formed a condensate of sulfur and antimony-trichloride plus the impurities present with uncondensables passing overhead to a vent or scrubber system. A portion of the crude antimony trichloride-sulfur liquid is normally employed to condense the gases entering the condensation zone, cool directly or indirectly the gas streams passing from the high temperature chlorination reactor and quench the reaction to maintain control over reaction temperature.

The balance of the crude stream is then passed to a purification zone where there is formed as the principal product, other than sulfur, antimony trichloride essentially free of arsenic.

Any sulfur which is carried over into the purification zone is recycled with some of the antimony trichloride back into the system.

Ultimately, however, all of the sulfur and all of the antimony trichloride generated in the high temperature chlorination reaction are recovered as products.

With reference now to the drawing, chlorination of the stibnite-bearing ore is carried out in reactor 10. Since the ore or ore concentrate is generally provided as a mass of particulate material, the reactor 10 is preferably operated as a fluid bed or semifluid bed reactor.

When used as such, chlorine is fed to reactor through line 12 with the reaction principally carried out in bed 14 at a temperature of from about 500 to about 550° C.

The ore solids are fed to the reactor through feed trough line 16 or a similar means. Where the solids present in the ore are fine or where the ore has a wide particle size distribution, the solids are preferably fed at the base of the bed to use the upper portion of the bed to maintain the fine particles in principal reaction zone 14 before they can escape the bed.

For complete reaction, a split stream of chlorine can be fed through line 18 to the solids-vapor zone 26 of the bed to react with any fine antimony sulfide which may have escaped the bed unreacted.

The reactor is generally refractory lined in the zone in contact with the bed or it may be water cooled at that portion.

To also control the temperature within the bed and particularly the solids-gas phase above the bed, there is preferably introduced through line 20 which services spray nozzles 22 and 24 a crude liquid mixture of antimony trichloride and sulfur which upon vaporization in the upper portion 26 of reactor 10 absorbs heat of reaction and aids in maintaining the desired temperature in reactor 10 substantially constant.

Alternatively, indirect cooling of the gaseous streams exiting the chlorination zone may be by any means including a stream comprising the metal chloride and sulfur such as antimony trichloride and sulfur.

Where the products streams are used as an indirect as opposed to a direct coolant, they may then be passed into the chlorination zone as a quench to aid in controlling chlorination temperature especially in the zone above the reactive bed.

The gaseous stream leaving the bed which contains vaporized sulfur, a metal chloride such as antimony trichloride, and a normal portion of the gangue from bed 14 are passed into conduit 28 where the temperature of the gaseous phase is reduced by direct cooling preferably by direct introducing of a liquid quench from line 30 which is again a crude mixture of metal chloride such as antimony trichloride and sulfur. The gaseous stream is generally cooled to a temperature of from about 400° to about 450° C. and fed to cyclone 32 or a similar device where the solid gangue particles are separated from the gas phase.

The gas phase exiting cyclone 32 via conduit 34 is further cooled as by indirect cooling or quenched by introducing the crude stream of a metal chloride and sulfur preferably liquid antimony trichloride and sulfur through line 36 to a temperature of from about 250° to about 350° C. for introduction to cyclone 38 where a portion of the sulfur present condenses as liquid along with any ferric chloride present. The liquid formed is separated from the gas stream in cyclone 38 which is the sole source of sulfur recovery in the operation.

The sulfur recovered as a liquid from cyclone 38 may then be purified by any conventional means.

The gas stream exiting cyclone 38 is then passed to a liquid gas splash tray condenser 40 by line 42. There the gas stream is brought into contact with a cooled liquid mixture of antimony trichloride and sulfur, circulated to condenser 40 by line 44 after passing through cooler 46. The temperature of the liquid stream from cooler 46 is generally from about 75° C. to about 220° C. preferably from about 120° to about 180° C. and is employed in condenser 40 and as the quench stream for feed to ducts 34 and 28 as well as reactor 10. The amount of the stream fed to each of the respective zones is dependent upon the temperature reduction desired as a consequence of the feed of the liquid stream and vaporization thereof.

Vapors which enter condenser 40 contain principally antimony trichloride and the remaining sulfur present in the gas stream and low boilers condensed and collected in reservoir 48.

Any noncondensables formed during the reaction, principally hydrogen chloride, and any other gases present pass overhead of column 40, cooled by cooler 50 and vented or further processed to eliminate any pollutants.

Reservoir 48 serves as a supply of crude antimony trichloride and sulfur for recycle to the system as a liquid quench and to provide a liquid antimony trichloride sulfur system for purification.

In order to obtain antimony trichloride as a final product, a portion of the condensed liquid in reservoir 48 is pumped by pump 52 through line 54 to heavy ends column 56 where there is formed a heavy boiling faction containing sulfur, residual antimony trichloride and some iron chloride which are removed at the base of column 56. The column bottoms are passed by line 58 and through pump 60 and split.

Part of the bottoms are recycled back for combination with the crude antimony trichloride stream by line 62 for ultimate recovery of sulfur from the process in cyclone 38.

The balance of the stream is passed by line 64 to reboiler 66 for recycle to column 56.

The light boiling fraction from column 66 comprising antimony trichloride and any arsenic chloride formed as a consequence of its presence in the ore are condensed in cooler 68, refluxed and then sent to light ends column 70. There, antimony trichloride is collected as the bottoms at the condensation temperature of antimony trichloride at the pressure employed which at atmospheric pressure is at a temperature of about 220° C. and drawn through line 72 to pump 74. A portion of the stream from pump 74 is split and passed through reboiler 76 for return to column 70.

The balance is passed by line 78 through cooler 80 and to collection vessel 82 where the antimony chloride is collected at a purity, generally in excess of 99 percent.

The upper or low boiling portion of column 70 is principally arsenic chloride which is cooled in cooler 82 and collected in vessel 84 for processing or disposal.

With this generalized description of the operation of the process of this invention, the following is a more detailed description of the preferred composition and conditions surrounding the use and operation of reservoir 48, columns 56 and 70.

As already indicated, one essential element of the process of this invention is the removal of liquid sulfur in cyclone 38 before passing the gas stream comprising antimony trichloride, sulfur, and other low boiling constituents to condenser 40.

There is generally formed in reservoir 48 a crude mixture of antimony trichloride and sulfur which preferably normally contains, based on a total weight of sulfur and antimony trichloride from about 1 to about 10% sulfur, preferably from about 1 to about 5% sulfur and has a high fusion temperature due to the presence of sulfur.

The effluent from reservoir 48 is combined with a portion of bottoms from column 56 which because sulfur separation is incomplete at this point, has a sulfur content of from about 15% to 60% more normally, and preferably from 20% to 30% sulfur.

To achieve a bottoms of the above composition, the bottoms leaving column 56 are normally at a temperature between 260° C. and 280° C., preferably from about 265° C. to about 275° C.

Using low temperature collection for the bottoms of column 56 offers several advantages as opposed to removing pure sulfur as a liquid. High temperatures are avoided, external heating is not required, inexpensive materials of construction may be used and heat is conserved.

The bottoms from column 56 are returned to reservoir 48 or, as shown, combined with the effluent from reservoir 48 to upgrade sulfur content of the liquid used as a cooling or quenching media.

The product from column 56 is antimony trichloride substantially free of sulfur but still containing some low boiling impurities such as arsenic trichloride. The effluent is passed to column 70 where there is formed a bottoms at a temperature of from about 220° C. to the boiling point of antimony trichloride, this providing a product which is essentially substantially 99 percent pure antimony trichloride.

The tops from column 70 are taken off at a temperature between 220° C. and the condensation temperature of the arsenic compound, preferably from about 220° C. to about 400° C. The arsenic compound, typically arsenic trichloride, is condensed from the effluent, preferably at a temperature from about 130° C. to about 140° C.

While the process of this invention has been described in terms of production of antimony trichloride, it is, as indicated, equally applicable for the formation of any metal chloride which boils at a temperature lower than the condensation temperature of sulfur and in which there is also formed as a consequence of the chlorination reaction, sulfur Some examples of the metal chlorides which may be formed in accordance with the practice of the process of this invention are the formation of aluminum chloride from aluminum sulfide, the formation of gallium trichloride from the sulfides of gallium, the formation of titanium tetrachloride from the sulfides of titanium and the like.

EXAMPLE

To a fluidized bed reactor which contains the bed of a stibnite ore concentrate containing 60% by weight antimony as antimony metal in the form of antimony sulfide and which occupies 20% of the height of the reactor, there is fed chlorine gas to the base of the reactor at the rate of 9 parts by weight per hour which is sufficient to slightly fluidize the bed and the vapor phase zone above the bed at the rate of 1 part by weight per hour.

An exothermic reaction is carried out and through external cooling and through the introduction of a crude antimony trichloride-sulfur liquid quench comprising 4% by weight sulfur based on the total weight of sulfur and antimony trichloride, to the vapor phase zone of the reactor at the rate of 30 parts by weight per hour, there is maintained in the reactor and with external cooling using water a reactor temperature between 500° C. and 550° C. Fresh stibnite ore concentrate is fed to the reactor at the rate of 19 parts by weight per hour.

There is carried overhead from the reactor a vapor phase comprising antimony trichloride, sulfur, arsenic trichloride, other impurities and some gangue particles. There is added to the gas stream a portion of the crude antimony trichloride-sulfur liquid identified above at the rate of 9 parts by weight per hour to reduce the temperature of the gas stream to between 400° C. and 450° C.

The cooled gas stream is sent to a first cyclone separator where the solid gangue particles are removed from the gas stream.

There is then added to the gas stream 21 parts by weight per hour of the same crude liquid antimony trichloride-sulfur stream to cool the gas stream to the temperature between 250° C. and 350° C. where it is passed to a second cyclone where sulfur is condensed at the rate of 6 parts by weight per hour. The sulfur collected contained trace amounts of iron chlorides.

The balance of the gas stream is passed to a splash spray condenser at the rate of 81 parts by weight per hour where it is brought into contact with the crude liquid mixture of antimony trichloride and sulfur identified above which is fed to the splash spray condenser at a temperature of 150° C. and at a rate of 950 parts by weight per hour.

The stream introduced prior to the sulfur cyclone, the gangue separation cyclone, as a reaction quench, is at approximately the same temperature.

All of the sulfur and antimony trichloride are condensed and collected in a reservoir. The uncondensables consisting predominantly of hydrogen chloride are passed to a scrubber system for recovery of hydrogen chloride.

The crude mixture of antimony trichloride and sulfur collected in the reservoir is passed from the reservoir at a rate of 1030 parts by weight per hour. Of this 98% is recycled for use in the splash spray condenser, to cool the gas streams passing to the first and second cyclones and to serve as a quench in the fludized bed reactor.

The balance of the liquid crude antimony trichloride-sulfur condensate is passed to a heavy ends rectification column where there is formed a bottoms at a temperature of 270° C., at the rate of 26 parts by weight per hour. Of this amount, 50% is recycled back to the column after being reheated to a temperature of 300° C.

The remainder is combined with the liquid exiting the crude antimony trichloride-sulfur reservoir to form part of the coolant stream for the front part of the reaction zone.

There is taken off at the top of the heavy ends column a vapor which comprises antimony trichloride and arsenic trichloride and other low boiling impurities at a temperature of 220° C. This represents 55% of the feed to the heavy ends column.

This vapor from the top of the heavy ends column is condensed and part of it refluxed back to the column and part of it fed to the light ends column where there is collected at the base liquid antimony trichloride at a temperature of 220° C.

Of the liquid collected 25% is reheated to a temperature of 240° C. and recycled back to the column. The balance is further cooled and sent to a collection vessel. There is taken off at the top of the column a gas stream at a temperature of 130° C., which comprises arsenic trichloride and other low boiling impurities which are cooled to a temperature of 90° C. to collect arsenic trichloride and the balance of the gas stream is sent to a scrubber to eliminate the lower boiling impurities.

The antimony trichloride recovered is about 99.90% pure whereas the sulfur recovered is about 95.0% pure.

What is claimed is:

1. A process for the production of antimony trichloride from stibnite bearing ores and ore concentrates which comprises:
   (a) contacting the stibnite bearing ore with gaseous chlorine in a chlorination zone maintained at a temperature sufficient to totally vaporize sulfur and sufficient to convert the stibnite to an antimony trichloride and form a gaseous stream comprising vaporized antimony trichloride and vaporized sulfur;
   (b) cooling the gaseous stream from the chlorination zone to condense a portion of the sulfur therefrom and form a resultant gaseous stream comprising antimony trichloride and residual sulfur;
   (c) separating the condensed sulfur from the resultant gaseous stream;
   (d) condensing at least the antimony trichloride and residual sulfur from the resultant gaseous stream to form a crude liquid condensate comprising antimony trichloride and sulfur;
   (e) distilling at least a portion of the crude liquid condensate to form:
      (i) a vapor phase comprising antimony trichloride, and
      (ii) a liquid phase comprising sulfur and residual antimony trichloride; and
   (f) collecting antimony trichloride as a condensate from the vapor phase comprising antimony trichloride.

2. A process as claimed in claim 1 in which the antimony trichloride is condensed from the vapor phase at temperature of at least about 200° C.

3. A process as claimed in claim 1 in which the gaseous stream from the chlorination zone is cooled by passage in indirect heat exchange with a portion of the crude liquid condensate comprising antimony trichloride and sulfur to condense sulfur from said gaseous stream.

4. A process as claimed in claim 3 in which the crude liquid condensate comprising antimony trichloride and sulfur is introduced into the chlorination zone as a quench after cooling the gaseous stream from the chlorination zone to condense sulfur to control the temperature in the chlorination zone.

5. A process as claimed in claim 1 in which the gaseous stream from the chlorination zone is cooled by passage in indirect heat exchange with a mixture of a portion of the crude liquid condensate comprising antimony trichloride and sulfur and at least a portion of the liquid phase comprising sulfur and residual antimony trichloride.

6. A process as claimed in claim 5 in which the combined portion of the crude liquid condensate comprising antimony trichloride and sulfur and at least a portion of the liquid phase comprising sulfur and residual antimony trichloride are introduced into the chlorination zone as a quench after cooling the gaseous stream from the chlorination zone to condense sulfur to control the temperature in the chlorination zone.

7. A process as claimed in claim 1 in which the gaseous stream from the chlorination zone is cooled by direct heat exchange by admixture of a portion of the crude condensate comprising antimony trichloride and sulfur with the gaseous stream from the chlorination zone.

8. A process as claimed in claim 1 in which the gaseous stream from the chlorination zone is cooled by direct heat exchange by admixture with a mixture of a portion of the crude liquid condensate comprising antimony trichloride and sulfur and at least a portion of the liquid phase comprising sulfur and residual antimony trichloride.

9. A process as claimed in claim 1 in which a portion of the condensed crude liquid comprising antimony trichloride and sulfur is recycled to at least:
   (a) condense a crude liquid comprising antimony trichloride and sulfur from said resultant gas stream, by direct heat exchange by admixture with said resultant gas stream;
   (b) cool the gaseous stream from chlorination zone to condense sulfur by direct heat exchange by admixture with the gaseous stream from said chlorination zone; and
   (c) control the temperature in the chlorination zone by introduction of a portion of the crude liquid stream to the chlorination zone as a quench.

10. A process as claimed in claim 9 in which the portion of the condensed crude liquid comprising antimony trichloride is combined with at least a portion of liquid condensate comprising sulfur and residual antimony trichloride.

11. A process as claimed in claim 1 in which chlorination is carried out at a temperature of from about 500° C. to about 550° C.

12. A process as claimed in claim 11 in which solids in the chlorination reaction zone are maintained in a fluidized state.

13. A process as claimed in claim 1 in which the solids in the chlorination reaction zone are maintained in a fluidized state.

14. A process as claimed in claim 13 in which any gangue carried over with the gaseous stream from the chlorination zone is settled, collected and separated from the gaseous stream before condensation of sulfur.

15. A process as claimed in claim 14 in which the gaseous stream is cooled prior to settling of the gangue.

16. A process as claimed in claim 15 in which cooling is by direct contact with a crude liquid mixture of antimony trichloride and sulfur.

17. A process as claimed in claim 16 in which the crude liquid mixture includes a portion of the liquid phase comprising sulfur and residual antimony trichloride.

18. A process for the production of antimony trichloride from stibnite bearing ores and ore concentrates which comprises:
   (a) contacting the stibnite bearing ore with gaseous chlorine in a chlorination zone at a temperature sufficient to totally vaporize sulfur and sufficient to convert the stibnite to antimony trichloride and sulfur in the form of a gaseous stream comprising vaporized antimony trichloride and vaporized sulfur;
   (b) cooling the gaseous stream from the chlorination zone with a crude liquid stream comprising antimony trichloride and sulfur to condense a portion of the sulfur and form a resultant gaseous stream;
   (c) separating the condensed sulfur from the resultant gaseous stream;
   (d) condensing the antimony trichloride and sulfur from the resultant gaseous stream to form a crude liquid comprising antimony trichloride and sulfur;
   (e) recycling a portion of the condensed crude liquid comprising antimony trichloride and sulfur to at least:
      (i) condense crude liquid comprising antimony trichloride and sulfur from said resultant gas stream,
      (ii) cool the gaseous stream from chlorination zone to condense sulfur; and
      (iii) control the temperature in the chlorination zone by introduction of the crude liquid stream to the chlorination zone;
   (f) treating the balance of the crude condensed liquid stream comprising antimony chloride and sulfur by distillation to form:
      (i) a vapor phase comprising antimony trichloride and
      (ii) a liquid phase comprising sulfur and antimony trichloride;

(g) combining at least a portion of the liquid phase comprising sulfur and antimony trichloride with the crude liquid stream comprising antimony trichloride and sulfur formed in step (d); and (h) collecting antimony trichloride as a condensate from the vapor phase comprising antimony trichloride at a temperature of at least about 220° C.

19. A process as claimed in claim 18 in which the solid in the chlorination reaction zone are maintained in a fluidized state.

20. A process as claimed in claim 19 in which any gangue carried over with gaseous stream comprising antimony trichloride and sulfur from the chlorination zone is settled, collected and separated from the gaseous stream before condensation of sulfur.

21. A process as claimed in claim 20 in which the gaseous stream is cooled by direct contact with a crude liquid mixture of antimony trichloride and sulfur prior to settling of the gangue.

22. A process as claimed in claim 21 in which the gaseous stream comprising antimony trichloride and sulfur is cooled to a temperature of from about 400° to about 450° C. prior to separation of the gangue.

23. A process as claimed in claim 22 in which sulfur is condensed from the gaseous stream from the chlorination zone at a temperature of from 250° to about 350° C.

24. A process as claimed in claim 18 in which sulfur is condensed from the gaseous stream from the chlorination zone at a temperature of from 250° to about 350° C.

25. A process as claimed in claim 18 in which the antimony trichloride and sulfur are condensed from the resultant gas stream by contact with a crude liquid stream comprising antimony trichloride and sulfur at a condensation temperature of from about 75° C. to about 220° C.

26. A process as claimed in claim 25 in which the crude liquid stream comprising antimony trichloride and sulfur contains from about 1% to about 10% by weight sulfur based on the total weight of sulfur and antimony trichloride.

27. A process as claimed in claim 25 in which the crude liquid stream comprising antimony trichloride and sulfur contains sulfur in an amount of from 1% to about 5% by weight sulfur based on the total weight of antimony trichloride and sulfur.

28. A process as claimed in claim 18 in which the crude liquid stream comprising antimony trichloride and sulfur contains from about 1% to about 10% by weight sulfur based on the total weight of sulfur and antimony trichloride.

29. A process as claimed in claim 18 in which the crude liquid stream comprising antimony trichloride and sulfur contains sulfur in an amount of from 1% to about 5% by weight sulfur based on the total weight of antimony trichloride and sulfur.

30. A process as claimed in claim 18 in which the liquid phase comprising sulfur and antimony trichloride obtained by treating the condensed liquid stream comprising antimony trichloride and sulfur which is not recycled is collected at a temperature between about 260° and 280° C.

31. A process as claimed in claim 30 in which the liquid phase contains from about 15% to 60% by weight sulfur based on the total weight of antimony trichloride and sulfur.

32. A process as claimed in claim 18 in which the liquid phase comprising sulfur and antimony trichloride obtained by treating the condensed liquid stream comprising antimony trichloride and sulfur which is not recycled is collected at a temperature between about 265° and 275° C.

33. A process as claimed in claim 32 in which the liquid phase contains from about 15% to 60% by weight sulfur based on the total weight of antimony trichloride and sulfur.

34. A process as claimed in claim 18 in which the liquid phase contains from about 20% to about 30% by weight sulfur.

35. A process as claimed in claim 34 in which the liquid phase contains from about 20% to about 30% by weight sulfur.

36. A process as claimed in claim 18 in which the vapor phase formed by distillation of the crude stream comprising antimony trichloride is separated from the distillation zone at a temperature of from about 200° C. to about 400° C. and then passed to a further distillation zone where there is formed antimony trichloride condensed at a temperature of at least 220° C. and a high boiling effluent carried off at a temperature between about 220° C. and about 400° C.

37. A process as claimed in claim 36 in which arsenic trichloride is condensed from the effluent at a temperature between 130° C. and about 140° C.

38. A process for the production of metal chlorides from the corresponding metal sulfides which metal chlorides have a boiling point below that of sulfur chlorination zone used in said production which comprises:

(a) contacting the metal sulfide with chlorine in a chlorination zone at a temperature sufficient to convert the metal sulfide to the corresponding metal chloride and sulfur and sufficient to form a gaseous stream comprising totally vaporized metal chloride and totally vaporized sulfur;

(b) cooling the gaseous stream from the chlorination zone to condense a portion of the sulfur therefrom and form a resultant gaseous stream comprising the metal chloride and residual sulfur;

(c) separating the condensed sulfur from the resultant gaseous stream;

(d) condensing at least the metal chloride and residual sulfur from the resultant gaseous stream to form a crude liquid condensate comprising the metal chloride and sulfur;

(e) distilling at least a portion of the crude liquid condensate to form:

(i) a vapor phase comprising the metal chloride, and (ii) a liquid phase comprising sulfur and residual metal chloride; and (f) collecting the metal chloride as a condensate from the vapor phase comprising the metal chloride.

39. A process as claimed in claim 38 in which the gaseous stream from the chlorination zone is cooled by passage in indirect heat exchange with a portion of the crude liquid condensate comprising metal chloride and sulfur to condense sulfur.

40. A process as claimed in claim 38 in which the gaseous stream from the chlorination zone is cooled by passage in indirect heat exchange with a mixture of a portion of the crude liquid condensate comprising metal chloride and sulfur and at least a portion of the liquid phase comprising sulfur and residual metal chloride to condense sulfur.

41. A process as claimed in claim 40 in which the crude liquid condensate comprising metal chloride and sulfur is introduced into the chlorination zone as a quench after cooling the gaseous stream from the chlorination zone to condense sulfur to control the temperature in the chlorination zone.

42. A process as claimed in claim 40 in which the combined portion of the crude liquid condensate comprising metal chloride and sulfur and at least a portion of the liquid phase comprising sulfur and residual metal chloride are introduced into the chlorination zone as a quench after cooling the gaseous stream from the chlorination zone to condense sulfur to control the temperature in the chlorination zone.

43. A process as claimed in claim 38 in which the gaseous stream from the chlorination zone is cooled by direct heat exchange by admixing a portion of the crude condensate comprising metal chloride and sulfur with the gaseous stream from the chlorination zone.

44. A process as claimed in claim 38 in which the gaseous stream from the chlorination zone is cooled by direct heat exchanger by admixture with a mixture of a portion of the crude liquid condensate comprising metal chloride and sulfur and at least a portion of the liquid phase comprising sulfur and residual metal chloride.

45. A process as claimed in claim 38 in which a portion of the condensed crude liquid comprising metal chloride and sulfur is recycled to at least:
 (a) condense crude liquid comprising metal chloride and sulfur from said resultant gas stream, by direct heat exchange by admixture with the resultant gas stream;
 (b) cool the gaseous stream from chlorination zone to condense sulfur by direct heat exchange by admixture with the gaseous stream from the chlorination zone; and
 (c) control the temperature in the chlorination zone by introduction of a portion of the crude liquid stream to the chlorination zone as a quench.

46. A process for the production of metal chlorides from the corresponding metal sulfides, which metal chlorides have a boiling point below that of sulfur in the chlorination zone used in said production which comprises:
 (a) contacting the metal sulfide with chlorine in a chlorination zone at a temperature sufficient to convert the metal sulfide to vaporized metal chloride and sulfur and sufficient to form a gaseous stream comprising totally vaporized metal chloride and totally vaporized sulfur;
 (b) cooling the gaseous stream from the chlorination zone with a crude liquid stream comprising the metal chloride and sulfur to condense a portion of sulfur from the resultant gaseous stream;
 (c) separating the condensed sulfur from the resultant gaseous stream;
 (d) condensing the metal chloride and sulfur from the resultant gaseous stream to form a crude liquid stream comprising the metal chloride and sulfur;
 (e) recycling a portion of the crude liquid stream comprising the metal chloride and sulfur to at least
  (i) condense the metal chloride and sulfur from resultant gas stream,
  (ii) cooling the gas stream from the chlorination zone to condense sulfur and
  (iii) control the temperature of the chlorination zone by introduction of the crude liquid stream to the vapor section of the chlorination zone as a quench;
 (f) treating the balance of the condensed liquid stream comprising the metal trichloride and sulfur by distillation to form:
  (i) a vapor phase comprising the metal chloride, and
  (ii) a liquid phase comprising sulfur and a metal chloride;
 (g) combining at least a portion of the liquid phase comprising sulfur and a metal chloride with the crude liquid stream comprising the metal chloride and sulfur formed in step (d); and
 (h) collecting the metal chloride as a condensate from the vapor phase comprising the metal trichloride at at least the condensation temperature of the metal chloride.

47. A process for the production of antimony trichloride from stibnite bearing ores and ore concentrates which comprises:
 (a) contacting the stibnite bearing ore with gaseous chlorine in a chlorination zone at a temperature from about 500° to about 550° C. to totally vaporize sulfur and to convert the stibnite to antimony trichloride and sulfur to form of gaseous stream comprising vaporized antimony trichloride and vaporized sulfur,
 (b) cooling the gaseous stream from the chlorination zone with a crude liquid stream comprising antimony trichloride and sulfur to condense a portion of the sulfur and form a resultant gaseous stream;
 (c) separating the condensed sulfur from the resultant gaseous stream;
 (d) condensing the antimony trichloride and sulfur from the resultant gaseous stream to form a crude liquid comprising antimony trichloride and sulfur;
 (e) recycling a portion of the condensed crude liquid comprising antimony trichloride and sulfur to at least:
  (i) condense crude liquid comprising antimony trichloride and sulfur from said resultant gas stream,
  (ii) cool the gaseous stream from chlorination zone to condense sulfur; and
  (iii) control the temperature in the chlorination zone by introduction of the crude liquid stream to the chlorination zone;
 (f) treating the balance of the crude condensed liquid stream comprising antimony trichloride and sulfur by distillation to form:
  (i) a vapor phase comprising antimony trichloride, and
  (ii) a liquid phase comprising sulfur and antimony trichloride;
 (g) combining at least a portion of the liquid phase comprising sulfur and antimony trichloride with the crude liquid stream comprising antimony trichloride and sulfur formed in step (d); and
 (h) collecting antimony trichloride as a condensate from the vapor phase comprising antimony trichloride at a temperature of at least about 220° C.

48. A process claimed in claim 47 in which the solids in the chlorination zone are maintained in a fluidized state.

49. A process as claimed in claim 48 which any gangue carried over with gaseous stream comprising antimony trichloride and sulfur from the chlorination zone is settled and collected and separated from the gaseous stream before condensation of sulfur.

50. A process as claimed in claim 49 in which the gaseous stream is cooled by direct contact with a crude liquid mixture of antimony trichloride and sulfur prior to settling of the gangue.

51. A process as claimed in claim 50 in which the gaseous stream comprising antimony trichloride and sulfur is cooled to a temperature of from about 400° to about 450° C. prior to separation of gangue.

References Cited

UNITED STATES PATENTS

| | | | |
|---|---|---|---|
| 2,895,797 | 7/1959 | Hill | 423—494 X |
| 2,102,737 | 12/1937 | Peck et al. | 423—491 |
| 3,212,847 | 10/1965 | Lerner | 423—491 X |
| 3,367,736 | 2/1968 | Sopchak | 423—491 |
| 3,432,255 | 3/1969 | Long et al. | 423—60 |

OTHER REFERENCES

Sedlacek et al., "Chemical Abstracts," vol. 45, p. 6111d (1951).

EARL C. THOMAS, Primary Examiner

J. COOPER, Assistant Examiner

U.S. Cl. X.R.

423—62, 79, 96, 136, 491, 492, 494, 495, 568, 571